US011922540B2

United States Patent
Yeh

(10) Patent No.: US 11,922,540 B2
(45) Date of Patent: Mar. 5, 2024

(54) SYSTEMS AND METHODS FOR SEGMENT-BASED VIRTUAL APPLICATION OF FACIAL EFFECTS TO FACIAL REGIONS DISPLAYED IN VIDEO FRAMES

(71) Applicant: Perfect Mobile Corp., New Taipei (TW)

(72) Inventor: Chun Ming Yeh, Taipei (TW)

(73) Assignee: PERFECT MOBILE CORP., New Taipei (TW)

( * ) Notice: Subject to any disclaimer, the term of this patent is extended or adjusted under 35 U.S.C. 154(b) by 34 days.

(21) Appl. No.: 17/848,805

(22) Filed: Jun. 24, 2022

(65) Prior Publication Data

US 2022/0319064 A1 Oct. 6, 2022

Related U.S. Application Data

(63) Continuation-in-part of application No. 17/161,864, filed on Jan. 29, 2021, now Pat. No. 11,404,086.
(Continued)

(51) Int. Cl.
*G06T 11/00* (2006.01)
*G06V 10/74* (2022.01)
(Continued)

(52) U.S. Cl.
CPC .............. *G06T 11/00* (2013.01); *G06V 10/74* (2022.01); *G06V 20/40* (2022.01); *G06V 40/171* (2022.01); *G06T 2200/24* (2013.01)

(58) Field of Classification Search
CPC ...... G06T 11/00; G06V 10/74; G06V 40/171; G06V 20/40
See application file for complete search history.

(56) References Cited

U.S. PATENT DOCUMENTS 8,737,815 B2 5/2014 Singer
8,908,904 B2 12/2014 Santos et al.
(Continued)

FOREIGN PATENT DOCUMENTS

CN 104574299 A 4/2015
CN 106231415 A 12/2016
(Continued)

OTHER PUBLICATIONS

"Beauty Box Video 4.0;" Digital Anarchy : Smart Tools for Creative Minds | Beauty Box Video: Auto Skin Retouching; 2015; pp. 1-30.
(Continued)

*Primary Examiner* — Mishawn N. Hunter
(74) *Attorney, Agent, or Firm* — McClure, Qualey & Rodack, LLP

(57) ABSTRACT

A computing device obtains a video and obtains a target facial image, where the target facial image comprises a target face to be edited. The computing device determines a target facial feature vector from the target facial image to be edited. For each of a plurality of frames in the video, the computing device is further configured to: identify facial regions of individuals depicted in the video, generate candidate facial feature vectors for each of the identified facial regions, compare each of the candidate facial feature vectors to the target facial feature vector, and apply a mask effect to facial regions of corresponding facial feature vectors based on the comparison to generate an edited video.

20 Claims, 11 Drawing Sheets

Related U.S. Application Data

(60) Provisional application No. 62/977,061, filed on Feb. 14, 2020.

(51) Int. Cl.
*G06V 20/40* (2022.01)
*G06V 40/16* (2022.01)

(56) References Cited

U.S. PATENT DOCUMENTS

| | | |
|---|---|---|
| 9,224,248 B2 | 12/2015 | Ye et al. |
| 10,395,436 B1 | 8/2019 | Li et al. |
| 2013/0088513 A1 | 4/2013 | Deng |
| 2014/0016823 A1 | 1/2014 | Ye et al. |
| 2018/0108160 A1 | 4/2018 | Chen et al. |
| 2018/0268207 A1 | 9/2018 | Kim et al. |
| 2018/0278879 A1 | 9/2018 | Saban et al. |
| 2018/0315337 A1 | 11/2018 | Shen et al. |
| 2019/0014884 A1 | 1/2019 | Fu et al. |
| 2019/0059561 A1 | 2/2019 | Shen et al. |
| 2019/0122404 A1* | 4/2019 | Freeman ............ G06V 40/161 |
| 2019/0244260 A1 | 8/2019 | Lin et al. |
| 2019/0246065 A1 | 8/2019 | Lee et al. |
| 2020/0211201 A1* | 7/2020 | Chiang ................ G06T 11/001 |
| 2021/0192703 A1 | 6/2021 | Wang et al. |

FOREIGN PATENT DOCUMENTS

| | | |
|---|---|---|
| CN | 107220960 A | 9/2017 |
| CN | 105118023 B | 12/2017 |
| CN | 110197462 A | 9/2019 |
| KR | 20190085802 A | 7/2019 |
| WO | 2018/070106 A1 | 4/2018 |

OTHER PUBLICATIONS

Li, C., et al.; "Simulating Makeup through Physics-based Manipulation of Intrinsic Image Layers;" 2015; pp. 4621-4629.
Guo, D., et al.; "Digital Face Makeup by Example;" pp. 1-7.
Blackmon, G.; "How to make and share your own Instagram face filters;" https://www.theverge.com/2019/8/16/20808954/instagram-face-filters-facebook-videos-effects-how-to-spark-ar-studio; Aug. 2019; pp. 1-14.
Murray, C.; How to Blur Faces/Objects in Video (3 Ways); https://www.fonepaw.com/video-editor/blur-face-object-in-video.html; Jun. 2019; pp. 1-9.
Hamilton, D.; "ModiFace Live applies virtual makeup to real-time video and video chats;" Dec. 2015; pp. 1-2.
"Magic Face Documentation;" pp. 1-7.
Chavez, E.; "The PicMonkey Mobile App Is Here, OMG Somebody Hold Us;" 2016; pp. 1-13.
Otake, T.; "Shiseido app adds makeup to faces on video conferences;" Oct. 2016; pp. 1-3.
Jago, M., et al.; "Adobe After Effects: Track facial features to apply precise effects;" Oct. 2019; pp. 1-3.
"YouCam Makeup-Magic Selfie Cam & Virtual Makeovers: Makeup App—Getting a Makeup Makeover Was Never This Easy;" pp. 1-7.

* cited by examiner

SYSTEMS AND METHODS FOR SEGMENT-BASED VIRTUAL APPLICATION OF FACIAL EFFECTS TO FACIAL REGIONS DISPLAYED IN VIDEO FRAMES

CROSS-REFERENCE TO RELATED APPLICATION

This application is a Continuation-In-Part of application Ser. No. 17/161,864, filed on Jan. 29, 2021, which claims the benefit of U.S. Provisional Patent Application entitled, "Simple viewer of video editing to apply effect on face by face recognition," having Ser. No. 62/977,061, filed on Feb. 14, 2020, the subject matter of which is incorporated herein by reference.

TECHNICAL FIELD

The present disclosure relates to systems and methods for performing segment-based virtual application of facial effects to facial regions displayed in video frames.

BACKGROUND

It can be challenging to apply special effects to the facial regions of individuals displayed in a video. Therefore, there is a need for an improved system and method for performing virtual application of facial effects.

SUMMARY

In accordance with one embodiment, a computing device obtains a video and obtains a target facial image, where the target facial image comprises a target face to be edited. The computing device determines a target facial feature vector from the target facial image to be edited. For each of a plurality of frames in the video, the computing device is further configured to: identify facial regions of individuals depicted in the video, generate candidate facial feature vectors for each of the identified facial regions, compare each of the candidate facial feature vectors to the target facial feature vector, and apply a mask effect to facial regions of corresponding facial feature vectors based on the comparison to generate an edited video.

Another embodiment is a system that comprises a memory storing instructions and a processor coupled to the memory. The processor is configured by the instructions to obtain a video and obtains a target facial image, where the target facial image comprises a target face to be edited. The processor is further configured to determine a target facial feature vector from the target facial image to be edited. For each of a plurality of frames in the video, the processor is further configured to: identify facial regions of individuals depicted in the video, generate candidate facial feature vectors for each of the identified facial regions, compare each of the candidate facial feature vectors to the target facial feature vector, and apply a mask effect to facial regions of corresponding facial feature vectors based on the comparison to generate an edited video.

Another embodiment is a non-transitory computer-readable storage medium storing instructions to be implemented by a computing device having a processor, wherein the instructions, when executed by the processor, cause the computing device to obtain a video and obtains a target facial image, where the target facial image comprises a target face to be edited. The processor is further configured to determine a target facial feature vector from the target facial image to be edited. For each of a plurality of frames in the video, the processor is further configured by the instructions to: identify facial regions of individuals depicted in the video, generate candidate facial feature vectors for each of the identified facial regions, compare each of the candidate facial feature vectors to the target facial feature vector, and apply a mask effect to facial regions of corresponding facial feature vectors based on the comparison to generate an edited video.

In accordance with another embodiment, a computing device obtains a video and obtains a target facial image, wherein the target facial image comprises a target face to be edited. The computing device determines a target facial feature vector from the target facial image to be edited. For each of a plurality of frames in the video, the computing device is further configured to: identify facial regions of individuals depicted in the video, generate candidate facial feature vectors for each of the identified facial regions, compares each of the candidate facial feature vectors to the target facial feature vector, and replace the target face with another face based on the comparison to generate an edited video.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the disclosure can be better understood with reference to the following drawings. The components in the drawings are not necessarily to scale, with emphasis instead being placed upon clearly illustrating the principles of the present disclosure. Moreover, in the drawings, like reference numerals designate corresponding parts throughout the several views.

DETAILED DESCRIPTION

Although video editing applications exist that allow users to incorporate special effects such as graphics and audio effects into videos, incorporating facial effects to the facial regions of individuals involves reviewing and identifying frames of interest within videos and then manually applying facial effects to facial regions within the frames of interest. Typically, performing this task is not feasible due to the length of videos and the number of times one or more facial regions of interest appear throughout the videos.

Various embodiments address these shortcomings of conventional applications and are directed to an improvement over existing applications by providing users with a tool for performing segment-based virtual application of facial effects to facial regions displayed in video frames. Specifically, an improved tool is provided where users can intuitively utilize a user interface to apply facial effects to facial regions of interest that are graphically represented as segments in the user interface. This improved tool allows users to efficiently apply facial effects to individual facial regions comprising graphical representations disposed in the user interface relative to a time axis, thereby allowing the user to quickly and efficiently control the duration in which facial effects are applied to facial regions of interest.

Figure 1:
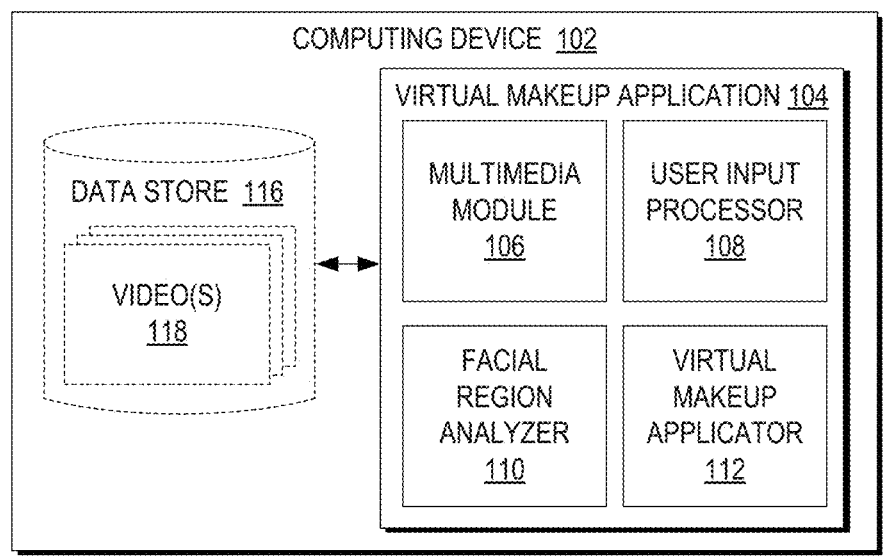
FIG. 1 is a block diagram of a computing device for segment-based virtual application of facial effects to facial regions displayed in video frames according to various embodiments of the present disclosure.

A description of a system for performing segment-based virtual application of facial effects to facial regions displayed in video frames is now described followed by a discussion of the operation of the components within the system. FIG. 1 is a block diagram of a computing device 102 in which the embodiments disclosed herein may be implemented. The computing device 102 may be embodied as a computing device such as, but not limited to, a smartphone, a tablet computing device, a laptop, and so on. A virtual makeup application 104 executes on a processor of the computing device 102 and includes a multimedia module 106, a user input processor 108, a facial region analyzer 110, and a virtual makeup applicator 112.

The multimedia module 106 is configured to obtain a video 118 from a data store 116 in the computing device 102, where the video 118 may be encoded in formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), 360 degree video, 3D scan model, or any number of other digital formats.

The user input processor 108 is configured to generate a user interface that displays playback of the video 118, where the user interface comprises a plurality of facial effects. The one or more facial effects may include, for example, a face-lift effect, an effect for blurring an entire facial region, and/or an effect for blurring target features in the facial region. The facial effects may also comprise predefined facial effects templates comprising combinations of facial effects. For example, one predefined facial effects template may comprise a particular lipstick and a particular eye shadow. The facial region analyzer 110 is configured to obtain a target facial image, wherein the target facial image comprises a target face to be edited. The facial region analyzer 110 also determines a target facial feature vector from the target facial image to be edited.

For each of a plurality of frames in the video 118, the virtual makeup applicator 112 identifies facial regions of individuals depicted in the video and generates candidate facial feature vectors for each of the identified facial regions. The virtual makeup applicator 112 compares each of the candidate facial feature vectors to the target facial feature vector and applies one or more facial effects to facial regions based on the comparison to generate an edited video. For some embodiments, the virtual makeup applicator 112 applies the one or more facial effects to target features in the facial regions when a difference between a corresponding candidate facial feature vector and the target facial feature vector is less than a threshold value. For other embodiments, the virtual makeup applicator 112 applies the one or more facial effects to entire facial regions when a difference between a corresponding candidate facial feature vector and the target facial feature vector is greater than a threshold value.

For some embodiments, the user input processor 108 is further configured to generate at least one graphical representation in the user interface for each facial region displayed in the video, where each graphical representation may comprise, for example, a bar shaped element. The length of each graphical representation shown relative to a time axis corresponds to a time duration in which a corresponding facial region is displayed in the video. Furthermore, the starting location of the graphical representation shown relative to the time axis corresponds to an instance in which the facial region begins to be displayed in the video for each graphical representation. Thumbnail previews of applied facial effects are displayed on the graphical representations of corresponding facial regions having applied facial effects. For some embodiments, graphical representations corresponding to different facial regions identified during playback of the video are grouped together in the user interface.

For some embodiments, the user input processor 108 obtains the selection of the one or more facial effects displayed in the user interface by detecting manipulation of one or more facial effects relative to the at least one graphical representation in the user interface. For some embodiments, manipulation of the one or more facial effects comprises detecting the user dragging one or more facial effects from a facial effects toolbox in the user interface to an area in the user interface occupied by the at least one graphical representation.

For some embodiments, the user input processor 108 obtains the selection of the one or more facial effects displayed in the user interface by detecting manipulation of the one or more facial effects relative to the at least one graphical representation in the user interface, where manipulation of the one or more facial effects comprises a first clicking operation by the user on the one or more facial effects in a facial effects toolbox in the user interface and a second clicking operation by the user in an area in the user interface occupied by the at least one graphical representation.

For some embodiments, the virtual makeup applicator 112 applies the one or more facial effects based on the selection of the one or more facial effects displayed in the user interface such that application of the one or more facial effects is displayed for only a duration of time corresponding to the at least one graphical representation such that application of the one or more facial effects is removed at the end of each of the at least one graphical representation. For some embodiments, the virtual makeup applicator 112 applies the one or more facial effects based on the selection of the one or more facial effects displayed in the user interface such that application of the one or more facial effects is applied to the at least one graphical representation and to all succeeding graphical representations of a same corresponding facial region in a remainder of the video.

Figure 2:
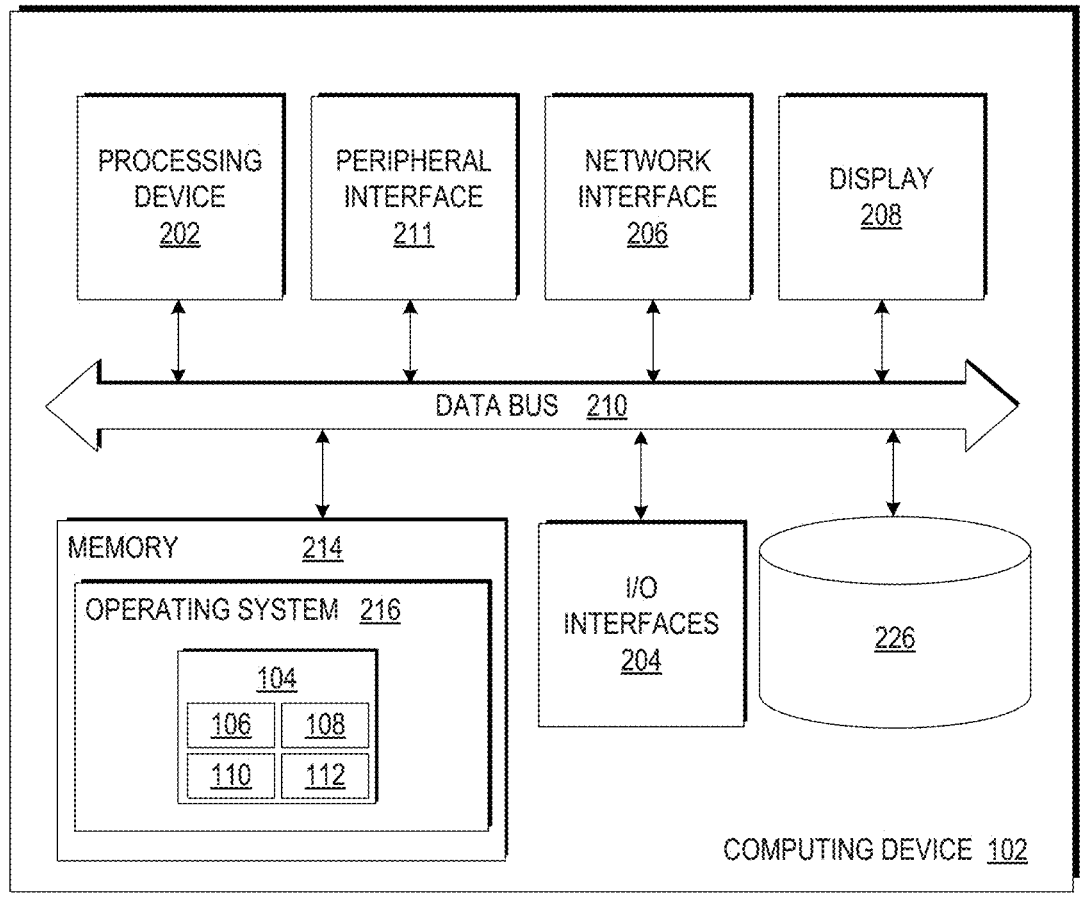
FIG. 2 is a schematic diagram of the computing device of FIG. 1 in accordance with various embodiments of the present disclosure.

FIG. 2 illustrates a schematic block diagram of the computing device 102 in FIG. 1. The computing device 102 may be embodied as a desktop computer, portable computer, dedicated server computer, multiprocessor computing device, smart phone, tablet, and so forth. As shown in FIG. 2, the computing device 102 comprises memory 214, a processing device 202, a number of input/output interfaces 204, a network interface 206, a display 208, a peripheral interface 211, and mass storage 226, wherein each of these components are connected across a local data bus 210.

The processing device 202 may include a custom made processor, a central processing unit (CPU), or an auxiliary processor among several processors associated with the computing device 102, a semiconductor based microprocessor (in the form of a microchip), a macroprocessor, one or more application specific integrated circuits (ASICs), a plurality of suitably configured digital logic gates, and so forth.

The memory 214 may include one or a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components of the computing device 102 displayed in FIG. 1.

In accordance with such embodiments, the components are stored in memory 214 and executed by the processing device 202, thereby causing the processing device 202 to perform the operations/functions disclosed herein. For some embodiments, the components in the computing device 102 may be implemented by hardware and/or software.

Input/output interfaces 204 provide interfaces for the input and output of data. For example, where the computing device 102 comprises a personal computer, these components may interface with one or more user input/output interfaces 204, which may comprise a keyboard or a mouse, as shown in FIG. 2. The display 208 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
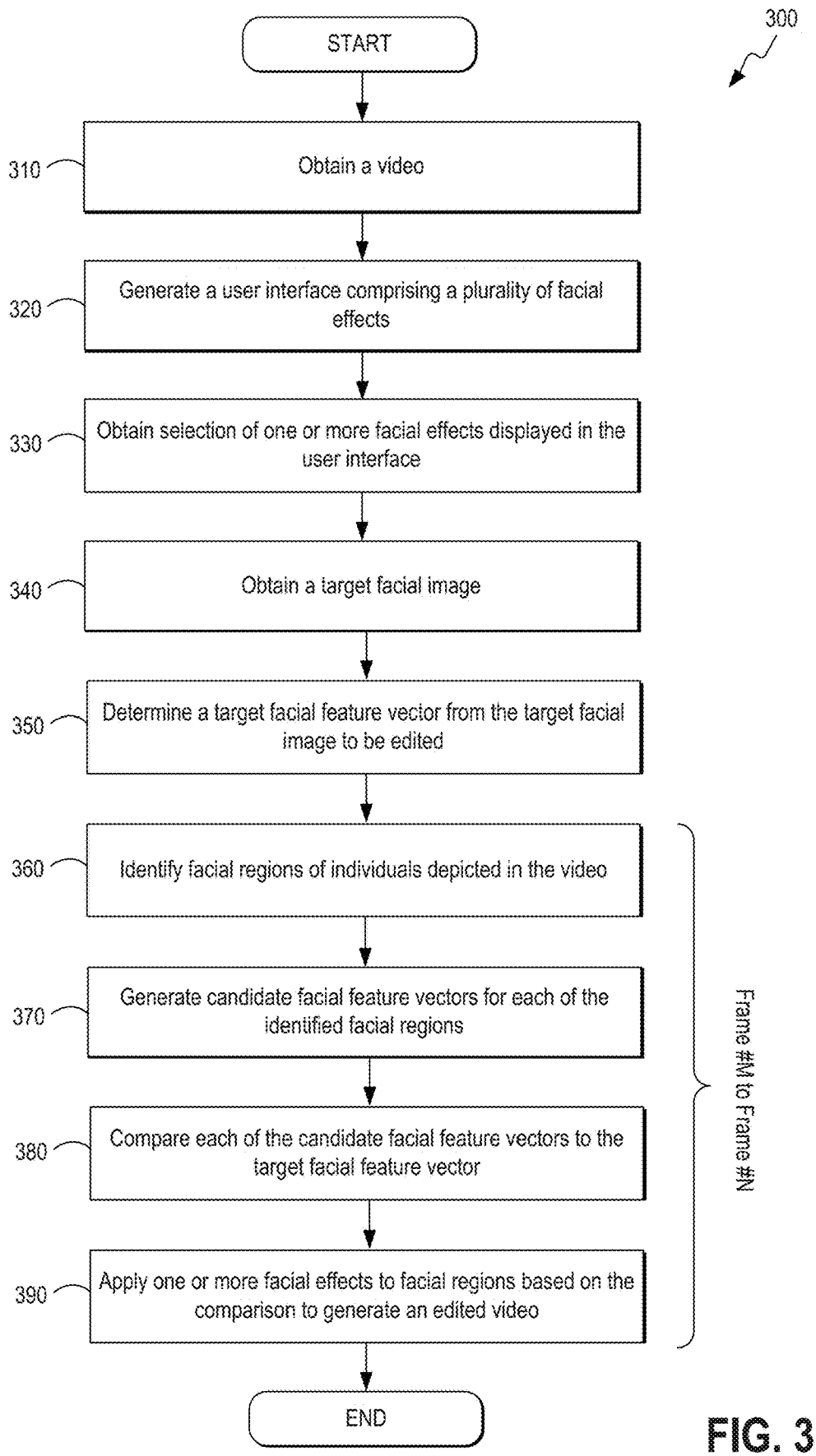
FIG. 3 is a top-level flowchart illustrating examples of functionality implemented as portions of the computing device of FIG. 1 for performing segment-based virtual application of facial effects to facial regions displayed in video frames according to various embodiments of the present disclosure.

Reference is made to FIG. 3, which is a flowchart 300 in accordance with various embodiments for segment-based virtual application of facial effects to facial regions displayed in video frames performed by the computing device 102 of FIG. 1. It is understood that the flowchart 300 of FIG. 3 provides merely an example of the different types of functional arrangements that may be employed to implement the operation of the various components of the computing device 102. As an alternative, the flowchart 300 of FIG. 3 may be viewed as depicting an example of steps of a method implemented in the computing device 102 according to one or more embodiments.

Although the flowchart 300 of FIG. 3 shows a specific order of execution, it is understood that the order of execution may differ from that which is displayed. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

At block 310, the computing device 102 obtains a video and in block 320, the computing device 102 generates a user interface displaying a plurality of facial effects. For some embodiments, the one or more facial effects may comprise, for example, a face-lift effect, an effect for blurring an entire facial region, an effect for blurring target features, and makeup effects (such as a lipstick effect, a foundation effect, an eye shadow effect, and an eye liner effect) in the facial region. The facial effects may comprise predefined facial effects templates comprising combinations of facial effects. Each of the plurality of facial effects templates comprises cosmetic effects utilized for achieving a corresponding cosmetic result. At block 330, the computing device 102 obtains selection of one or more facial effects displayed in the user interface. At block 340, the computing device 102 obtains a target facial image comprising a target face to be edited. At block 350, the computing device 102 determines a target facial feature vector from the target facial image to be edited.

Block 360 to block 390 described below are performed for each of a plurality of frames (frame #M to frame #N) within the video. At block 360, the computing device 102 identifies facial regions of individuals depicted in the video. At block 370, the computing device 102 generates candidate facial feature vectors for each of the identified facial regions. At block 380, the computing device 102 compares each of the candidate facial feature vectors to the target facial feature vector.

At block 390, the computing device 102 applies one or more facial effects to facial regions based on the comparison to generate an edited video. For some embodiments, the one or more facial effects are applied to target features in the facial regions when a difference between a corresponding candidate facial feature vector and the target facial feature vector is less than a threshold value. For some embodiments, the one or more facial effects are applied to entire facial regions when a difference between a corresponding candidate facial feature vector and the target facial feature vector is greater than a threshold value. For some embodiments, the user can select one or more facial regions for blurring certain regions. This may include, for example, blurring images of individuals other than the user.

For some embodiments, the computing device 102 is further configured to generate at least one graphical representation in the user interface for each facial region displayed in the video, where the length of each graphical representation relative to a time axis corresponds to a time duration in which a corresponding facial region is displayed in the video. Furthermore, the starting location of the graphical representation relative to the time axis corresponds to an instance in which the facial region begins to be displayed in the video for each graphical representation. Each graphical representation may comprise, for example, a bar shaped element. For some embodiments, thumbnail previews of applied facial effects are displayed on graphical representations of corresponding facial regions having applied facial effects. Graphical representations corresponding to different facial regions identified during playback of the video may be grouped together.

For some embodiments, the selection of the one or more facial effects displayed in the user interface may comprise manipulation of one or more facial effects relative to the at least one graphical representation in the user interface. Manipulation of the one or more facial effects comprises detecting the user dragging one or more facial effects from a facial effects toolbox in the user interface to an area in the user interface occupied by the at least one graphical representation. Manipulation of the one or more facial effects may also comprise a first clicking operation by the user on the one or more facial effects in a facial effects toolbox in the user interface and a second clicking operation by the user in an area in the user interface occupied by the at least one graphical representation.

For some embodiments, the application of the one or more facial effects is performed based on the selection of the one or more facial effects displayed in the user interface such that application of the one or more facial effects is displayed for only a duration of time corresponding to the at least one graphical representation such that application of the one or more facial effects is removed at the end of each of the at least one graphical representation. For other embodiments, the application of the one or more facial effects is performed based on the selection of the one or more facial effects displayed in the user interface such that application of the one or more facial effects is applied to the at least one graphical representation and to all succeeding graphical representations of a same corresponding facial region in a remainder of the video. Thereafter, the process in FIG. 3 ends.

Figure 4:
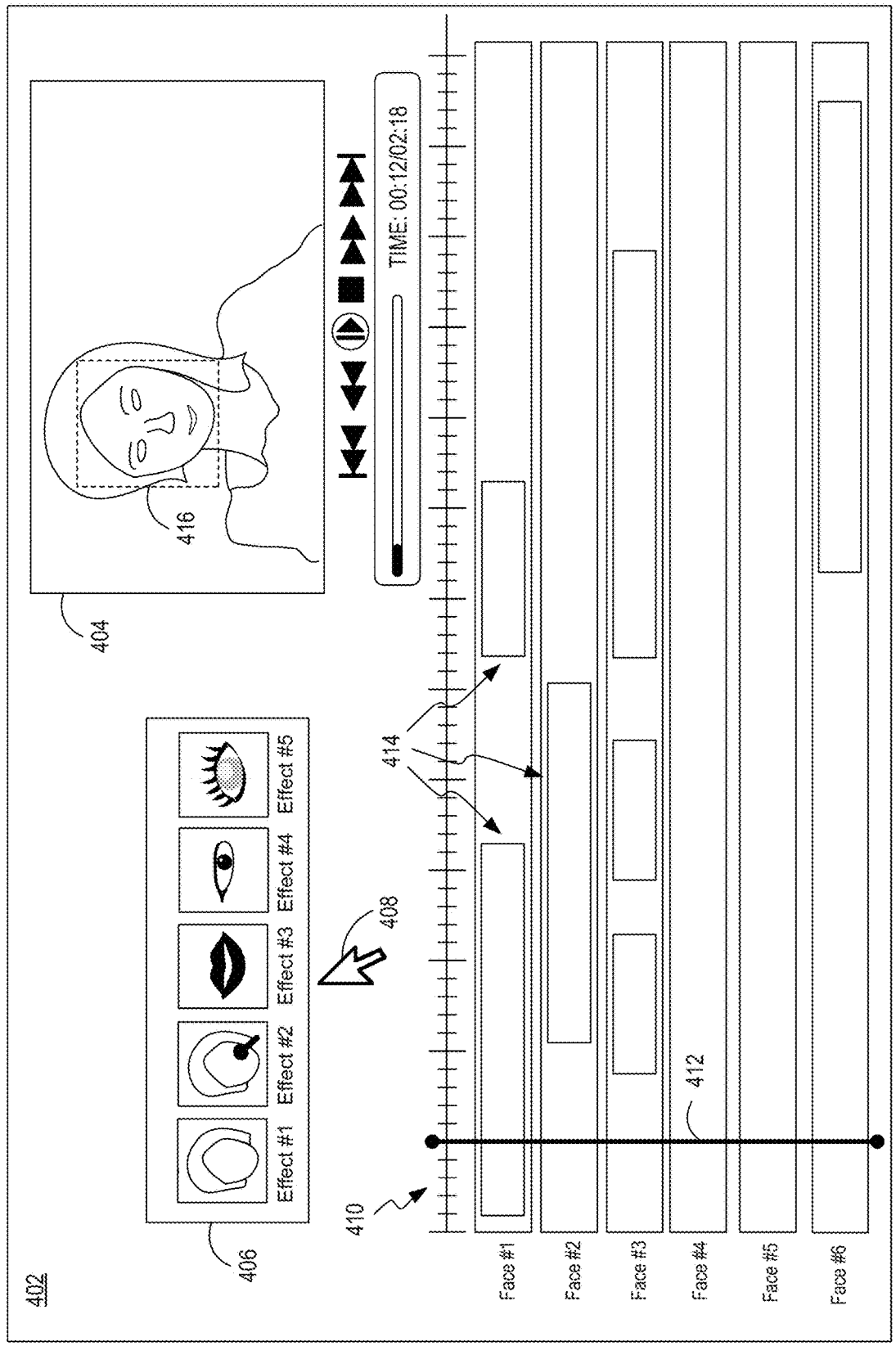
FIG. 4 illustrates an example user interface generated by the computing device of FIG. 1 according to various embodiments of the present disclosure.

To further illustrate various aspects of the present invention, reference is made to the following figures. FIG. 4 illustrates an example user interface 402 generated by the computing device 102 of FIG. 1. The user interface 402 includes a window 404 for displaying playback of a video 118 (FIG. 1). A facial effects toolbox 406 in the user interface 402 contains various facial effects that the user can apply to facial regions 416 displayed during playback of the video 118. As described in more detail below, the user can navigate between the facial effects toolbox 406 and various graphical representations 414 to apply desired facial effects to facial regions 416. This can be accomplished, for example, using a mouse 408 or by performing gestures on a touchscreen display.

The user interface 402 also includes a horizontal element representing a time axis 410, where a progress bar element 412 indicates playback progression of the video 118. As described earlier, the user input processor 108 (FIG. 1) in the computing device 102 identifies one or more facial regions 416 displayed in the video 118. For each facial region 416, the user input processor 108 generates one or more segments or graphical representations 414 in the user interface 402 where the length of each segment or graphical representation 414 relative to the time axis 410 corresponds to the time duration in which a corresponding facial region 416 is displayed in the video 118.

As shown in the example user interface 402 in FIG. 4, the graphical representation 414 may comprise a bar shaped element where the length of the bar in the horizontal direction corresponds to the length of time in which the facial region is displayed in the video 118. Furthermore, the starting point of the graphical representation shown relative to the time axis 410 denotes the starting point in which the facial region 416 initially appears in the video 118 for that graphical representation. Each instance in which a particular facial region 416 is displayed in the video 118 is represented by a corresponding graphical representation 414.

The graphical representations 414 shown in the user interface 402 correspond to facial regions 416 of one or more individuals displayed during playback of the video 118. As shown in the example user interface 402 of FIG. 4, the graphical representations 414 associated with unique facial regions 416 are grouped together in the same row along the time axis 410 such that each row of graphical representations 414 corresponds to a facial region 416 of a different individual.

Figure 5:
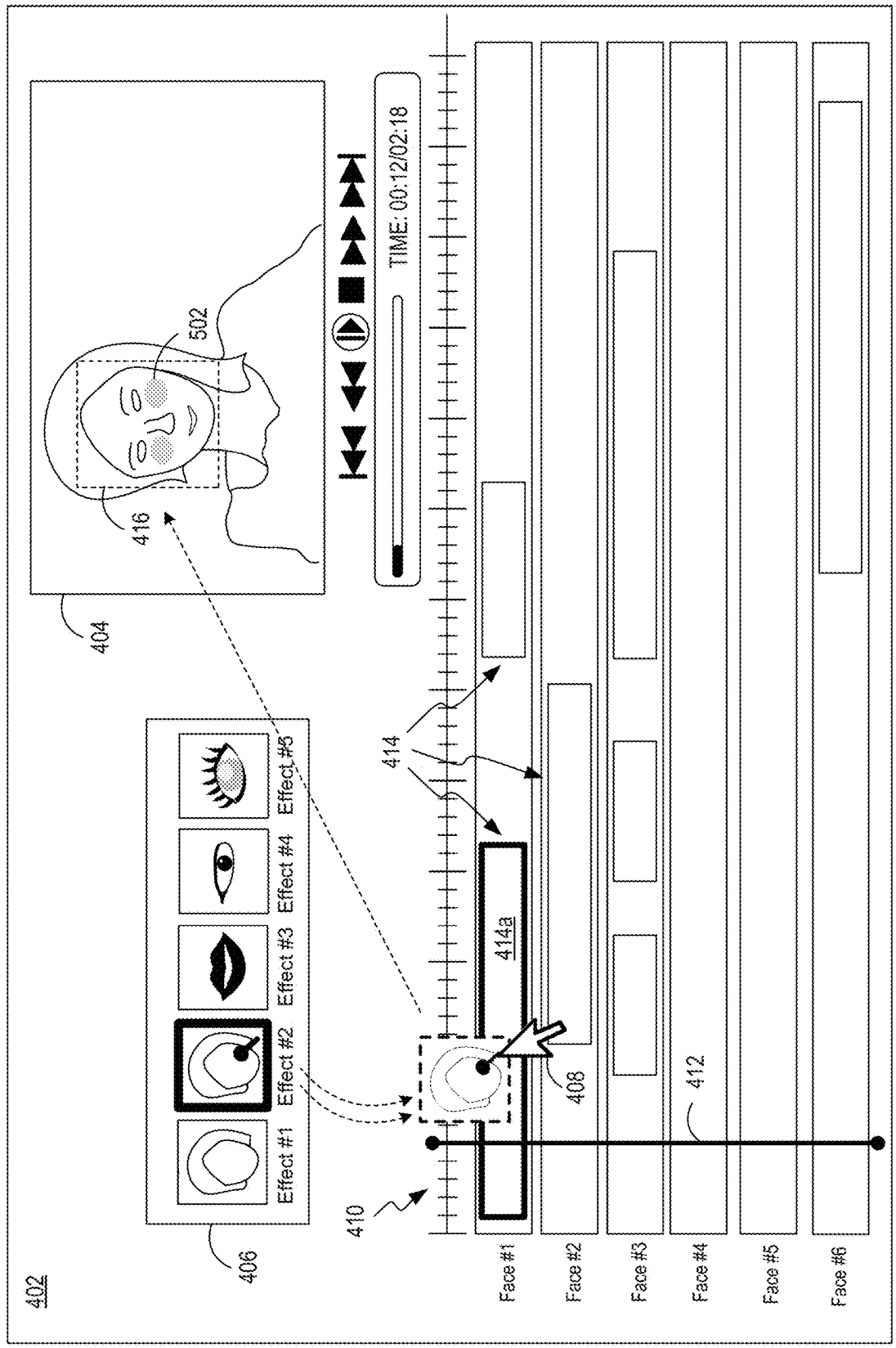
FIG. 5 illustrates virtual application of a facial effect to a facial region corresponding to a graphical representation by the computing device of FIG. 1 according to various embodiments of the present disclosure.

FIG. 5 illustrates virtual application of a facial effect to a facial region 416 corresponding to a graphical representation 414 according to various embodiments of the present disclosure. As described earlier, the facial region analyzer 110 (FIG. 1) in the computing device 102 is configured to obtain user input comprising manipulation of one or more facial effects relative to one or more graphical representations 414 in the user interface 402. As illustrated in FIG. 5, the user input may comprise the user using a mouse 408, for example, to drag one or more desired facial effects from a facial effects toolbox 406 in the user interface 402 to an area in the user interface occupied by a graphical representation 414a of interest. Once the computing device 102 detects the user dragging the one or more desired facial effects to the area occupied by the graphical representation 414a of interest, the virtual makeup applicator 112 (FIG. 1) applies the selected facial effect 502 to the facial region 416 associated with the graphical representation 414a.

For other embodiments, the user input may comprise the user using a mouse 408, for example, to perform a first clicking operation on one or more desired facial effects in the facial effects toolbox 406 in the user interface 402 followed by the user performing a second clicking operation in an area in the user interface occupied by the graphical representation 414a. Once the computing device 102 detects the occurrence of these clicking operations, the virtual makeup applicator 112 applies the one or more selected facial effects 502 to the facial region 416 associated with the graphical representation 414a.

Figure 6:
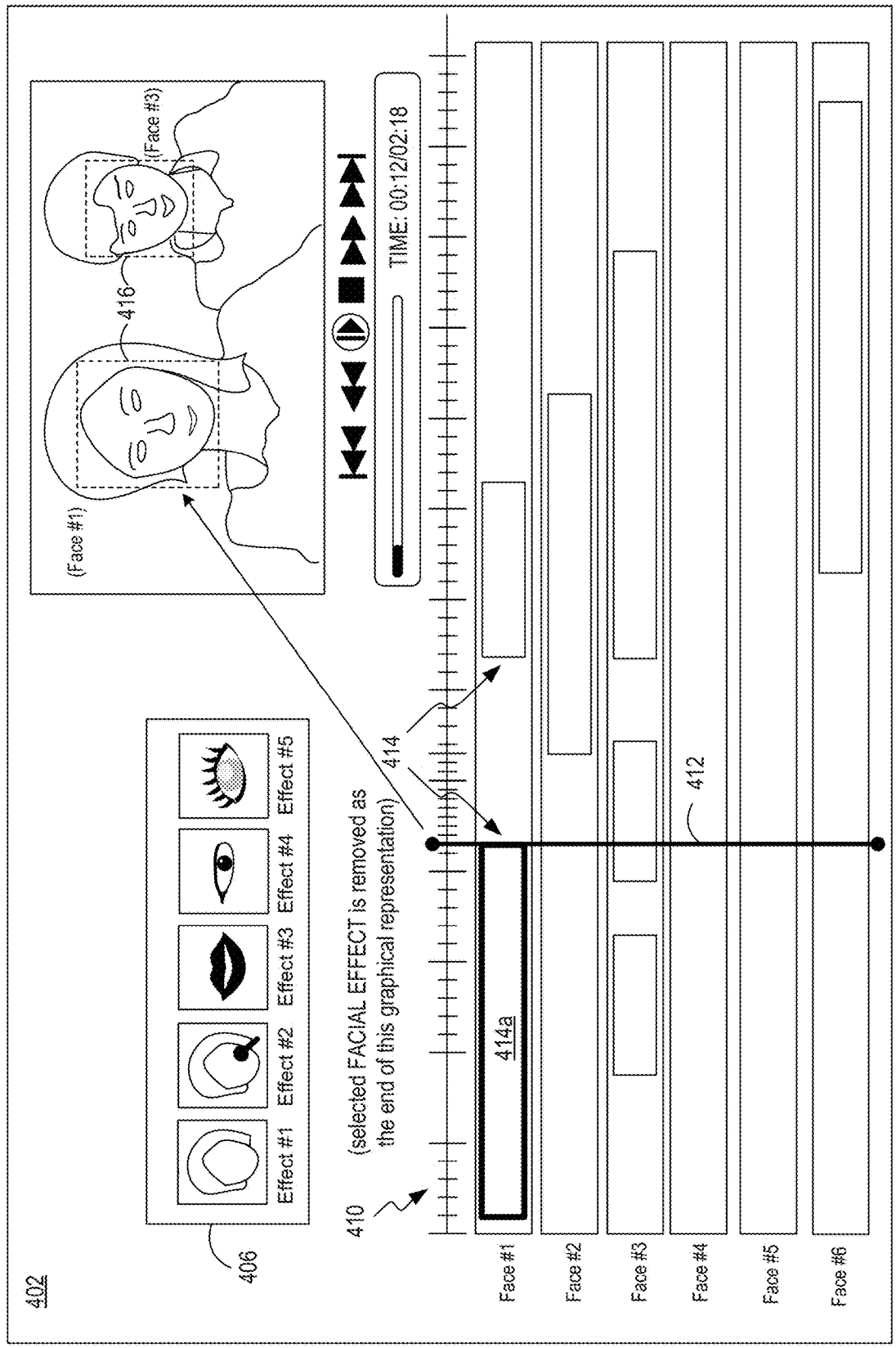
FIG. 6 illustrates local application of a facial effect to a facial region corresponding to a graphical representation by the computing device of FIG. 1 according to various embodiments of the present disclosure.

FIG. 6 illustrates local application of a facial effect to a facial region 416 corresponding to a graphical representation 414 according to various embodiments of the present disclosure. For some embodiments, application of a facial effect is performed only on the graphical representation 414 or segment of interest. As described above, the user selects a facial effect from the facial effects toolbox 406 and applies the selected facial effect to a target graphical representation 414. Referring back briefly to FIG. 5, the user applies the selected facial effect 502 to a target graphical representation 414a. In the illustration shown in FIG. 6, the facial effect 502 (FIG. 5) applied in FIG. 5 is removed from the facial region 416 once playback of the video 118 (FIG. 1) reaches the end of the target graphical representation 414a. In this regard, the user is able to apply facial effects on a segment-by-segment basis.

Figure 7:
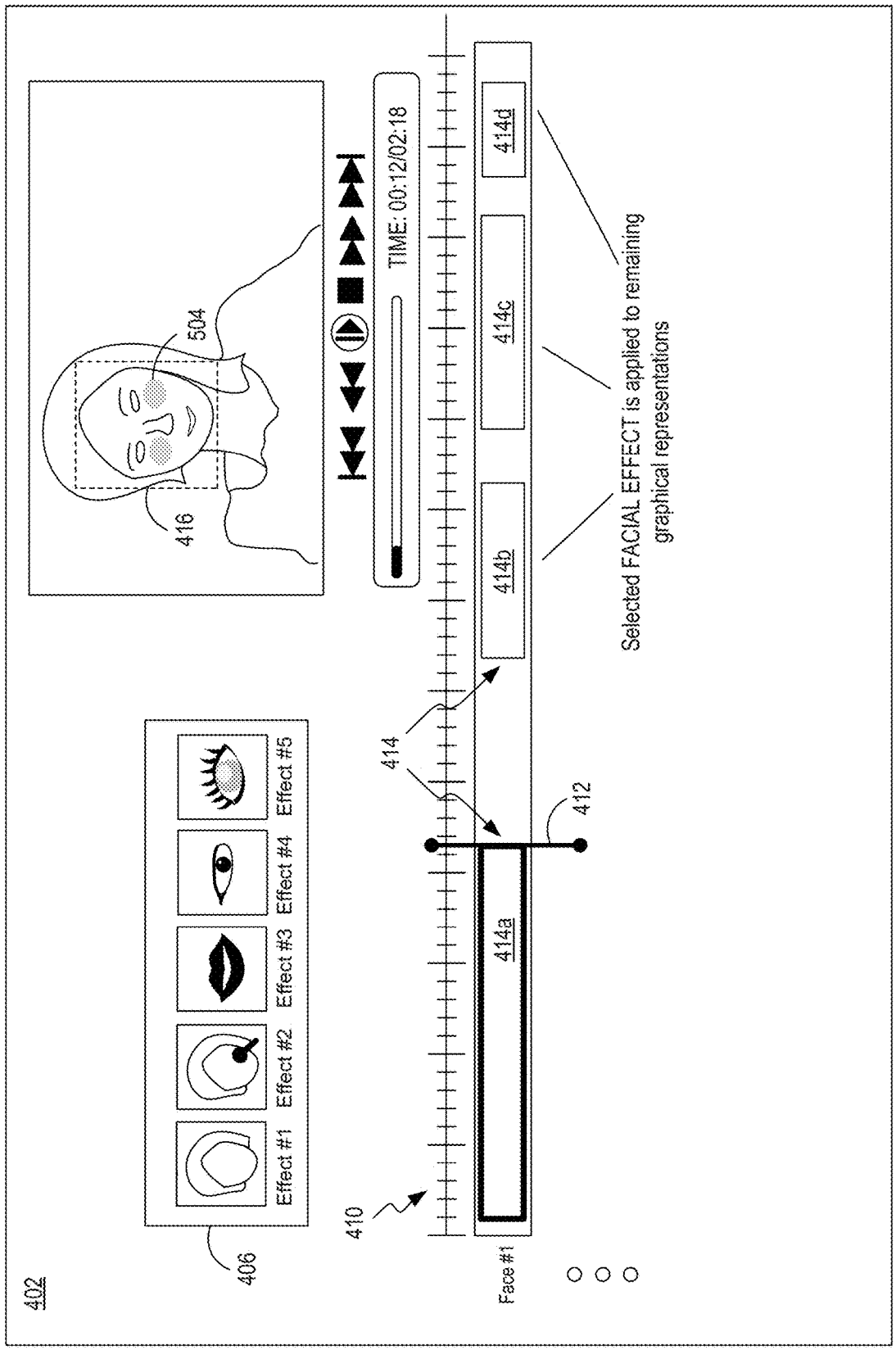
FIG. 7 illustrates global application of a facial effect to a facial region corresponding to a graphical representation by the computing device of FIG. 1 according to various embodiments of the present disclosure.

FIG. 7 illustrates global application of a facial effect to a facial region 416 corresponding to a graphical representation 414 according to various embodiments of the present disclosure. For some embodiments, application of a facial effect is performed not only on the graphical representation 414 or segment of interest but also on all graphical representations 414 that follow the target graphical representation 414a when the facial effect was initially applied. As described above, the user selects a facial effect from the facial effects toolbox 406 and applies the selected facial effect to a target graphical representation 414a.

Figure 8:
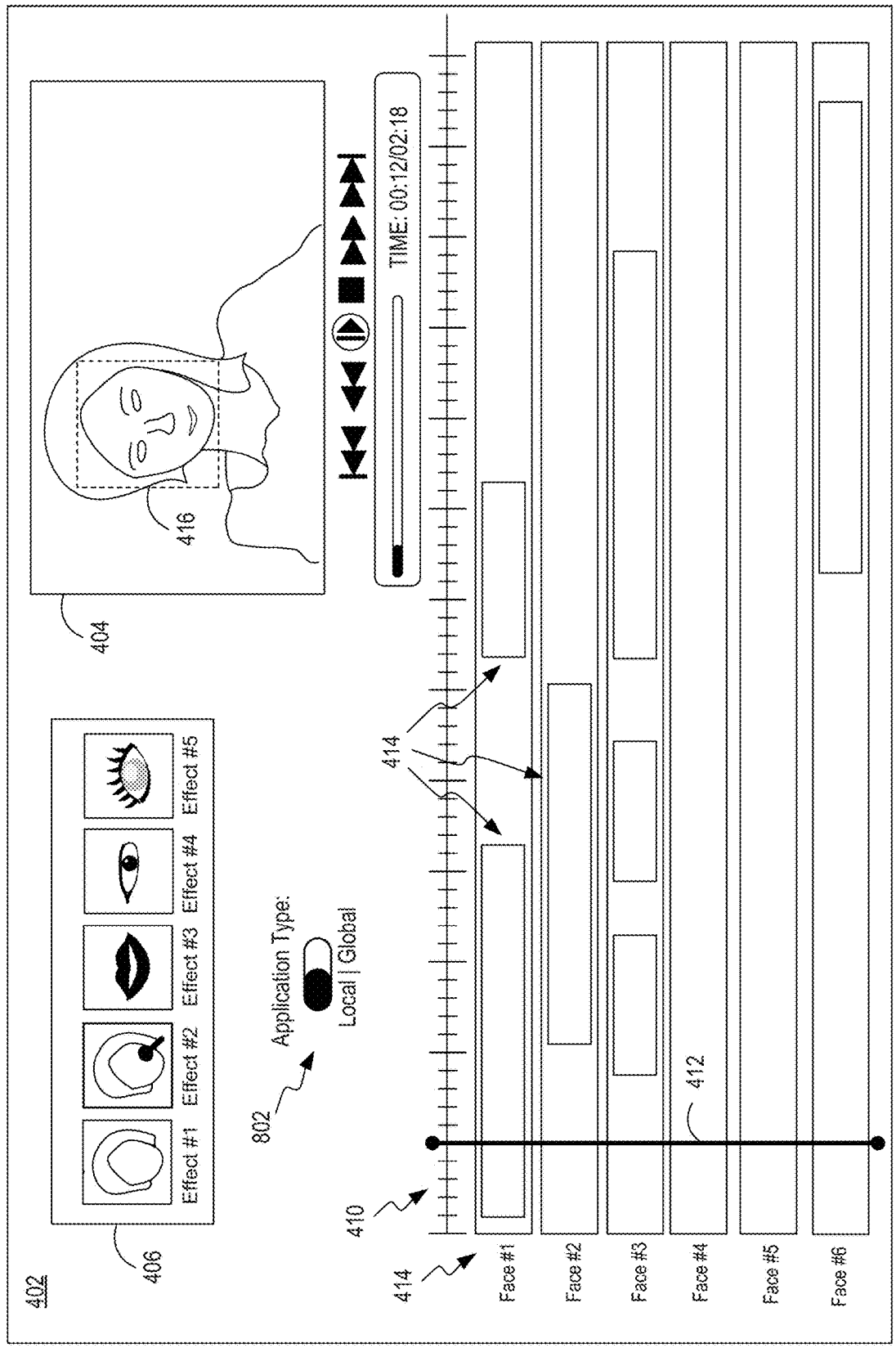
FIG. 8 illustrates the user specifying whether to apply facial effects on a local basis or on a global basis by controlling a toggle switch in the user interface according to various embodiments of the present disclosure.

Referring back briefly to FIG. 5, the user applies the selected facial effect 502 to a target graphical representation 414a. In the illustration shown in FIG. 7, the facial effect 502 (FIG. 5) applied in FIG. 5 remains on the facial region and is applied to all graphical representations 414b, 414c, 414d that follow the target graphical representation 414a found in the remainder of the video. As shown in FIG. 8, the user is able to specify whether to apply facial effects on a local basis or on a global basis by controlling a toggle switch 802 or other control element in the user interface 402. Furthermore, the user is able to specify the application type (local versus global) on a face-by-face basis.

Figure 9:
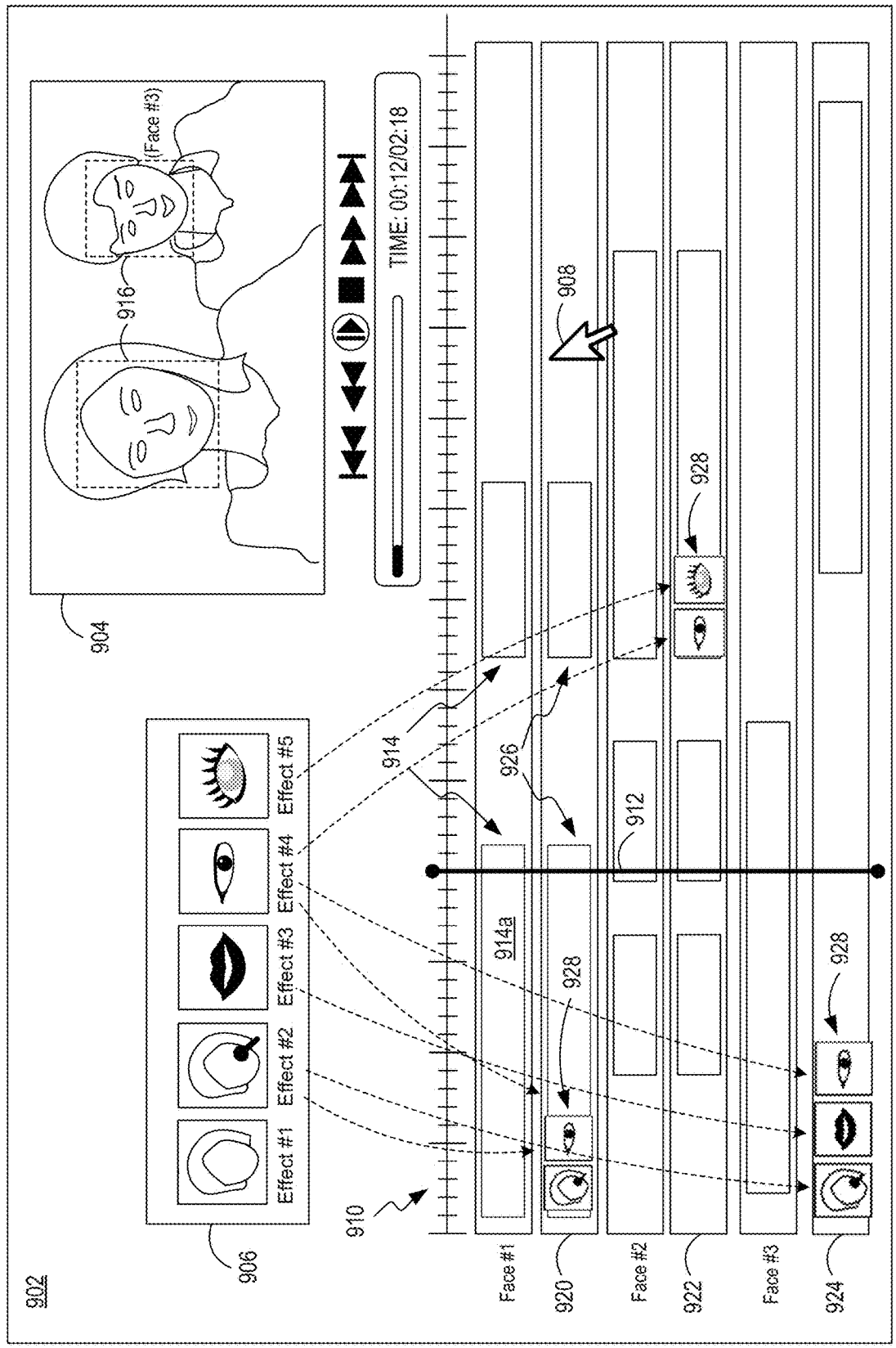
FIG. 9 illustrates an alternative embodiment of a user interface generated by the computing device of FIG. 1 according to various embodiments of the present disclosure.

FIG. 9 illustrates an alternative embodiment of a user interface 902 generated by the computing device 102 of FIG. 1. Similar to the user interface 402 shown in FIG. 4, the user interface 902 in FIG. 9 includes a window 904 for displaying playback of a video 118 (FIG. 1). A facial effects toolbox 906 in the user interface 902 contains various facial effects that the user can apply to facial regions 916 displayed during playback of the video 118. As described in more detail below, the user can navigate between the facial effects toolbox 906 and various graphical representations 914 to apply desired facial effects to facial regions 916. This can be accomplished, for example, using a mouse 908 or by performing gestures on a touchscreen display.

The user interface 902 also includes a horizontal element representing a time axis 910, where a progress bar element 912 indicates playback progression of the video 118. As described earlier, the user input processor 108 (FIG. 1) in the computing device 102 identifies one or more facial regions 416 displayed in the video 118. For each facial region 916, the user input processor 108 generates one or more segments or graphical representations 914 in the user interface 902 where the length of each segment or graphical representation 914 relative to the time axis 910 corresponds to the time duration in which a corresponding facial region 916 is displayed in the video 118.

As shown in the example user interface 902 in FIG. 9, the graphical representation 914 may comprise a bar shaped element where the length of the bar in the horizontal direction corresponds to the length of time in which the facial region is displayed in the video 118. Furthermore, the starting point of the graphical representation shown relative to the time axis 910 denotes the starting point in which the facial region 916 initially appears in the video 118 for that graphical representation. Each instance in which a particular facial region 916 is displayed in the video 118 is represented by a corresponding graphical representation 914.

The graphical representations 914 shown in the user interface 902 correspond to facial regions 916 of one or more individuals displayed during playback of the video 118. As shown in the example user interfaces 402, 902 of FIGS. 6 and 9, the graphical representations 914 associated with unique facial regions 916 are grouped together in the same row along the time axis 910 such that each row of graphical representations 914 corresponds to a facial region 916, 416 of a different individual.

In the embodiment shown, each row of graphical representations corresponding to Face #1, Face #2, Face #3 includes a corresponding row 920, 922, 924 where each row 920, 922, 924 similarly contains graphical representations 926. The graphical representation 926 for the corresponding rows 920, 922, 924 contain one or more thumbnail previews 928 of the one or more selected facial effects applied to the facial region 916 of the user, thereby allowing the user to view which facial effects are being applied during a given segment for a particular facial region 916. For example, the thumbnail preview 928 shows facial effect #2 and facial effect #4 applied to Face #1 for a given segment, while another thumbnail preview 928 shows facial effect #4 and facial effect #5 applied to Face #2 for a given segment. Yet another thumbnail preview 928 shows facial effect #2, facial effect #3, and facial effect #4 applied to Face #3 for a given segment.

In the improved user interface, the user can later remove facial effects by simply removing the corresponding thumbnail preview 928. This may be accomplished, for example, by double-clicking on the facial effect (e.g., facial effect #4) to remove the makeup effect from a particular region 916. Furthermore, the user can drag one or more facial effects from rows 920, 922, 944 to remove facial effects. The graphical representations 926 for the corresponding rows 920, 922, 924 contain one or more thumbnail previews 928 of the one or more selected facial effects applied to the facial region 916 of the user. For some embodiments, the thumbnail previews 928 may be removed by checking a selection box corresponding to the thumbnail preview 928.

Figure 10:
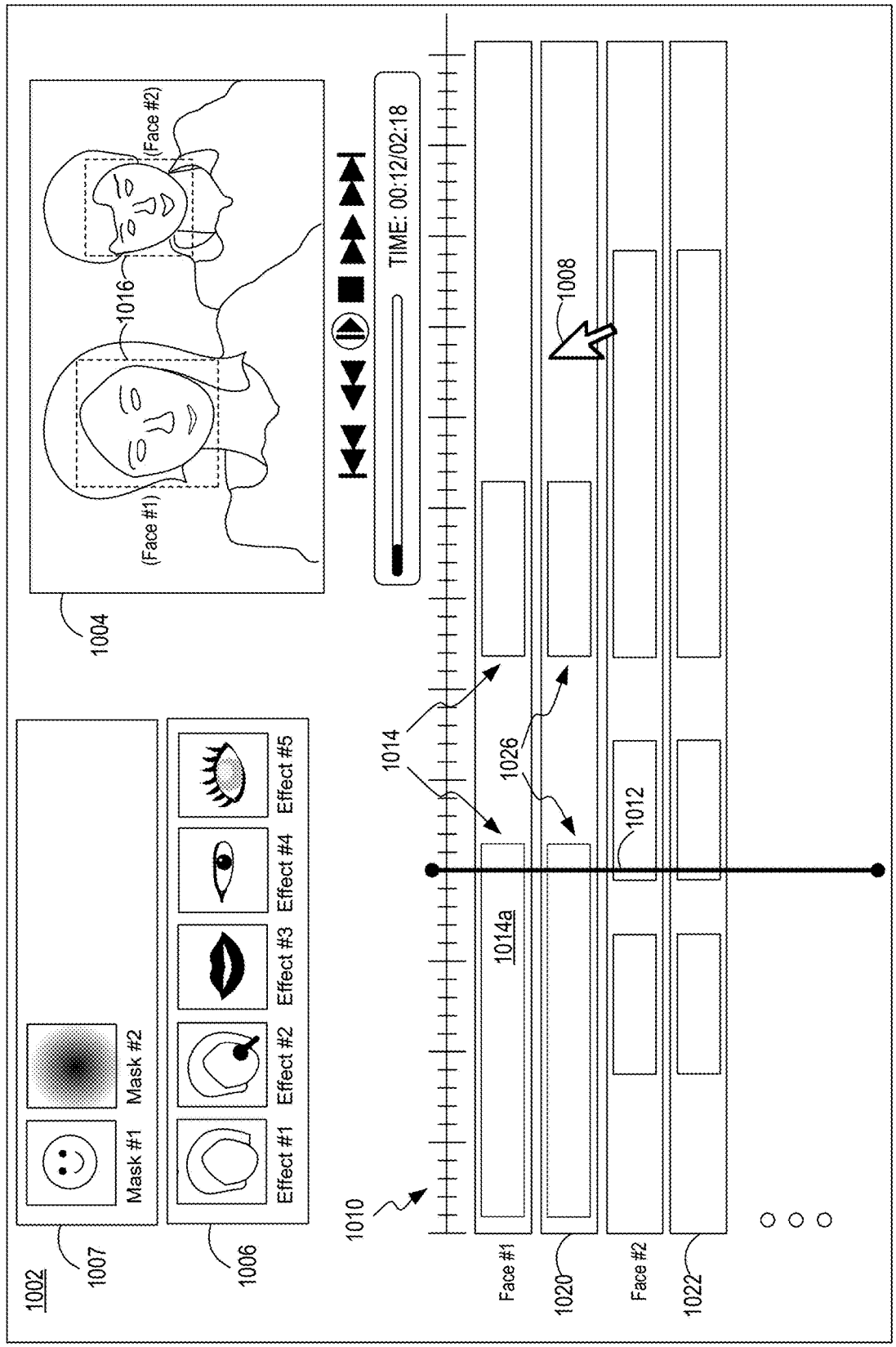
FIG. 10 illustrates a user interface that includes a mask effects toolbar according to alternative embodiments of the present disclosure.

FIG. 10 illustrates an alternative embodiment of a user interface 1002 generated by the computing device 102 of FIG. 1. Similar to the user interface 402 shown in FIG. 4, the user interface 1002 in FIG. 10 includes a window 1004 for displaying playback of a video 118 (FIG. 1). A facial effects toolbox 1006 in the user interface 1002 contains various facial effects that the user can apply to one or more target facial regions 1016 displayed during playback of the video 118 where the user selects the one or more target facial regions 1016. The user can navigate between the facial effects toolbox 1006 and various graphical representations 1014 to apply desired facial effects to the one or more target facial regions 1016. This can be accomplished, for example, using a mouse 1008 or by performing gestures on a touchscreen display.

The user interface 1002 also includes a horizontal element representing a time axis 1010, where a progress bar element 1012 indicates playback progression of the video 118. As described earlier, the user input processor 108 (FIG. 1) in the computing device 102 identifies one or more facial regions displayed in the video 118. For each facial region, the user input processor 108 generates one or more segments or graphical representations 1014 in the user interface 1002 where the length of each segment or graphical representation 1014 relative to the time axis 1010 corresponds to the time duration in which a corresponding facial region 1016 is displayed in the video 118.

As shown in the example user interface 1002 in FIG. 10, the graphical representation 1014 may comprise a bar shaped element where the length of the bar in the horizontal direction corresponds to the length of time in which the facial region is displayed in the video 118. Furthermore, the starting point of the graphical representation shown relative to the time axis 1010 denotes the starting point in which each facial region initially appears in the video 118 for that graphical representation. Each instance in which a particular facial region is displayed in the video 118 is represented by a corresponding graphical representation 1014.

The graphical representations 1014 shown in the user interface 1002 correspond to facial regions of one or more individuals displayed during playback of the video 118. The graphical representations 1014 associated with unique facial regions are grouped together in the same row along the time axis 1010 such that each row of graphical representations 1014 corresponds to a facial region 1016, 416 of a different individual.

For some embodiments, the user selects one or more target facial regions 1016 for applying facial effects, and any facial regions that are not selected are hidden from view. In other instances, the user selects one or more target facial regions 1016 simply to remain in view while any facial regions that are not selected are hidden from view. This feature is useful, for example, if the user wishes to protect the privacy of individuals depicted in the video that do not match the one or more target facial regions 1016 selected by the user. In accordance with such embodiments, a mask effect is applied to any facial regions that are not selected. In the example shown, the user interface 1002 includes a mask effect toolbar 1007. The user selects a desired mask effect such as a blurring effect, a sticker, or emoji from the mask effect toolbar 1007, where the selected mask effect is applied to any facial regions that are not selected by the user. That is, the selected mask effect is applied to any facial regions that do not match the one or more target facial regions 1016.

Figure 11:
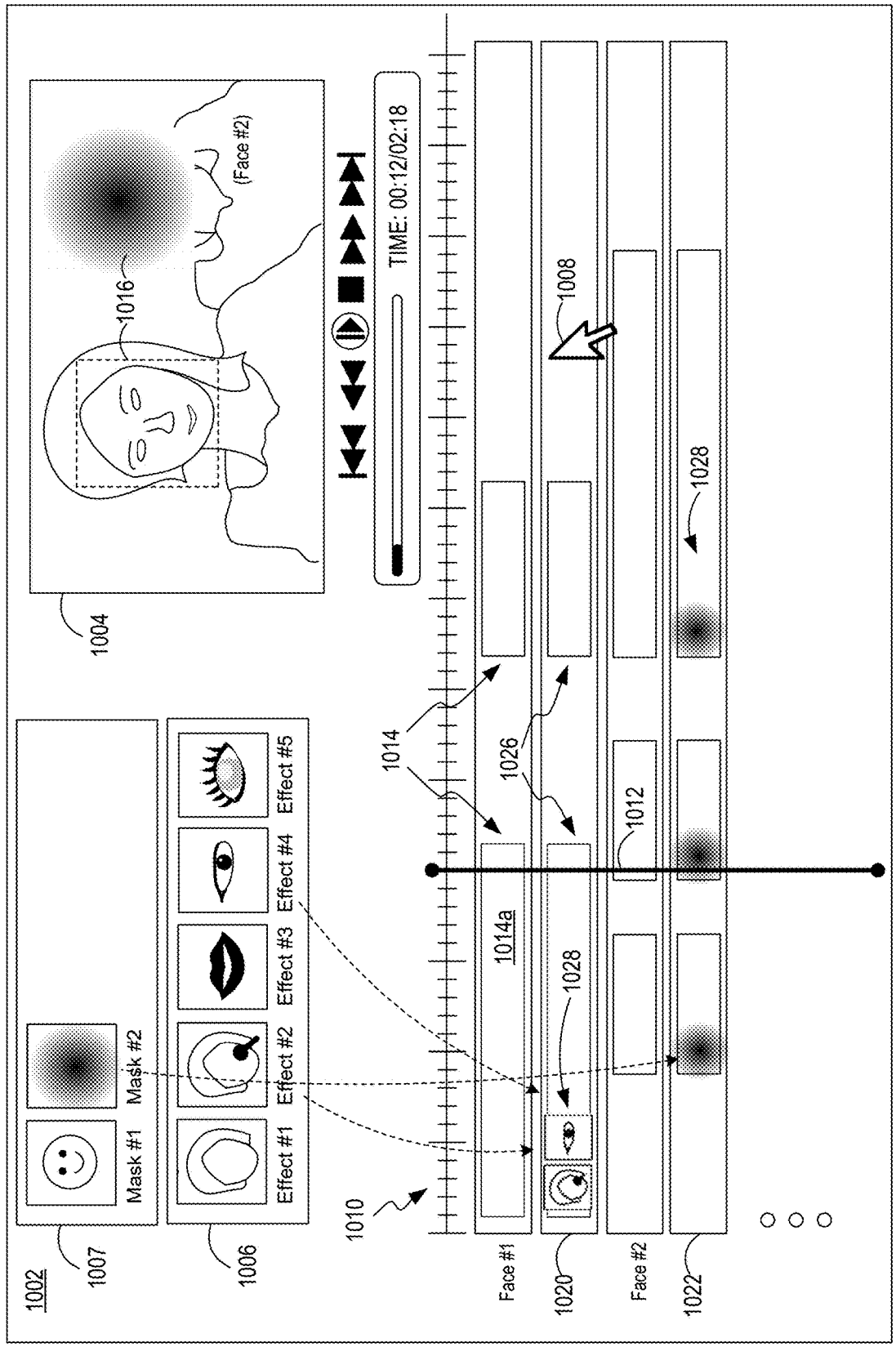
FIG. 11 illustrates application of a mask effect to a facial region not selected by the user according to alternative embodiments of the present disclosure.

For purposes of illustration, suppose that in FIG. 10, the user selects Face #1 as a target facial region and that Face #2 is not selected. In accordance with such embodiments, Face #2 is hidden from view by applying a mask effect selected from the mask effect toolbar 1007. In the example shown, each row of graphical representations corresponding to Face #1, Face #2, includes a corresponding row 1020, 1022 where each row 1020, 1022 similarly contains graphical representations 1026. The graphical representation 1026 for the corresponding rows 1020, 1022 contain one or more thumbnail previews 1028 of the one or more selected facial effects applied to the facial region 1016 of the user, thereby allowing the user to view which facial effects are being applied during a given segment for a particular facial region 1016. For example, as shown in FIG. 11, the thumbnail preview 1028 shows facial effect #2 and facial effect #4 applied to Face #1 for a given segment, while another thumbnail preview 1028 shows a mask effect (Mask #2) applied to Face #2 for each segment depicting Face #2.

As discussed earlier, the user can later remove facial effects by simply removing the corresponding thumbnail preview 1028. This may be accomplished, for example, by double-clicking on the facial effect (e.g., facial effect #4) to remove the makeup effect from a particular region 1016. Furthermore, the user can drag one or more facial effects from rows 1020, 1022 to remove facial effects. The graphical representations 1026 for the corresponding rows 1020, 1022 contain one or more thumbnail previews 1028 of the one or more selected facial effects applied to the facial region 1016 of the user. For some embodiments, the thumbnail previews 1028 may be removed by checking a selection box corresponding to the thumbnail preview 1028. Note that the user is not required to apply facial effects to the target facial region 1016 as the user may utilize the features described above simply to hide the facial regions of individuals that do not match the target facial region selected by the user.

A description of an alternative system for performing segment-based virtual application of facial effects to facial regions displayed in video frames is now described followed by a discussion of the operation of the components within the system. Referring back to FIG. 1, the computing device 102 executes a virtual makeup application 104, which includes a multimedia module 106, a user input processor 108, a facial region analyzer 110, and a virtual makeup applicator 112.

In accordance with alternative embodiments, the multimedia module 106 is configured to obtain a video 118 from a data store 116 in the computing device 102, where the video 118 may be encoded in formats including, but not limited to, Motion Picture Experts Group (MPEG)-1, MPEG-2, MPEG-4, H.264, Third Generation Partnership Project (3GPP), 3GPP-2, Standard-Definition Video (SD-Video), High-Definition Video (HD-Video), Digital Versatile Disc (DVD) multimedia, Video Compact Disc (VCD) multimedia, High-Definition Digital Versatile Disc (HD-DVD) multimedia, Digital Television Video/High-definition Digital Television (DTV/HDTV) multimedia, Audio Video Interleave (AVI), Digital Video (DV), QuickTime (QT) file, Windows Media Video (WMV), Advanced System Format (ASF), Real Media (RM), Flash Media (FLV), an MPEG Audio Layer III (MP3), an MPEG Audio Layer II (MP2), Waveform Audio Format (WAV), Windows Media Audio (WMA), 360 degree video, 3D scan model, or any number of other digital formats.

In accordance with alternative embodiments, the user input processor 108 is configured to generate a user interface that displays playback of the video 118, where the user interface comprises a plurality of facial effects. The one or more facial effects may include, for example, a face-lift effect, an effect for blurring an entire facial region, and/or an effect for blurring target features in the facial region. The facial effects may also comprise predefined facial effects templates comprising combinations of facial effects. For example, one predefined facial effects template may comprise a particular lipstick and a particular eye shadow. The facial region analyzer 110 is configured to obtain a target facial image from the video 118, wherein the target facial image comprises a target face to be edited. The facial region analyzer 110 also determines a target facial feature vector from the target facial image to be edited. For some embodiments, the one or more facial effects are applied to the target face when a difference between a corresponding candidate facial feature vector and the target facial feature vector is less than a threshold value. For some embodiments, the one or more facial effects are applied to facial regions that do not match the target face when a difference between a corresponding candidate facial feature vector and the target facial feature vector is greater than a threshold value.

For each of a plurality of frames in the video 118, the virtual makeup applicator 112 identifies facial regions of individuals depicted in the video and generates candidate facial feature vectors for each of the identified facial regions.

For some alternative embodiments, the virtual makeup applicator 112 compares each of the candidate facial feature vectors to the target facial feature vector and applies a mask effect to facial regions of corresponding facial feature vectors that do not match the target facial feature vector to generate an edited video. For yet other embodiments, rather than applying a mask effect to facial regions that do not match the target facial feature vector, the virtual makeup applicator 112 replaces the target face with another face if the face matches the target face. However, the user also has the option of replacing all faces other than the target face. Thus, the user controls which faces are replaced with another face.

For some embodiments, the virtual makeup applicator 112 replaces the target face with another face when a difference between a corresponding candidate facial feature vector and the target facial feature vector is less than a threshold value. For some embodiments, the virtual makeup applicator 112 replaces all faces other than the target face when a difference between a corresponding candidate facial feature vector and the target facial feature vector is greater than a threshold value.

The mask effect comprises a face-lift effect, an effect for blurring an entire facial region, and/or an effect for blurring target features in the facial region. The user input processor 108 is further configured to generate, for each facial region displayed in the video, at least one graphical representation in the user interface. A length of each graphical representation relative to a time axis corresponds to a time duration in which a corresponding facial region is displayed in the video. A starting location of the graphical representation relative to the time axis corresponds to an instance in which the facial region begins to be displayed in the video for each graphical representation. Each graphical representation comprises a bar shaped element, and graphical representations corresponding to different facial regions identified during playback of the video are grouped together.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

At least the following is claimed:

1. A virtual makeup method implemented in a computing device, comprising:
   obtaining a video;
   obtaining a target facial image, wherein the target facial image comprises a target face to be edited;
   determining a target facial feature vector from the target facial image to be edited; and
   for each of a plurality of frames in the video, performing the steps of:
   identifying facial regions of individuals depicted in the video;
   generating candidate facial feature vectors for each of the identified facial regions;
   comparing each of the candidate facial feature vectors to the target facial feature vector; and
   applying a mask effect to facial regions of corresponding facial feature vectors based on the comparison to generate an edited video, wherein applying the mask effect to facial regions further comprises applying the mask effect to the target face when a difference between a corresponding candidate facial feature vector and the target facial feature vector is less than a threshold value.

2. The method of claim 1, wherein the target facial image is obtained from the video.

3. The method of claim 1, wherein the mask effect comprises at least one of: a face-lift effect; an effect for blurring an entire facial region; or an effect for blurring target features in the facial region.

4. The method of claim 1, further comprising:
   for each facial region displayed in the video, generating at least one graphical representation in a user interface, wherein a length of each graphical representation relative to a time axis corresponds to a time duration in which a corresponding facial region is displayed in the video, wherein a starting location of the graphical representation relative to the time axis corresponds to an instance in which the facial region begins to be displayed in the video for each graphical representation.

5. The method of claim 4, wherein each graphical representation comprises a bar shaped element.

6. The method of claim 1, wherein graphical representations corresponding to different facial regions identified during playback of the video are grouped together.

7. A virtual makeup method implemented in a computing device, comprising:
   obtaining a video;
   obtaining a target facial image, wherein the target facial image comprises a target face to be edited;
   determining a target facial feature vector from the target facial image to be edited; and
   for each of a plurality of frames in the video, performing the steps of:
   identifying facial regions of individuals depicted in the video;
   generating candidate facial feature vectors for each of the identified facial regions;
   comparing each of the candidate facial feature vectors to the target facial feature vector; and
   applying a mask effect to facial regions of corresponding facial feature vectors based on the comparison to generate an edited video, wherein applying the mask effect to facial regions further comprises applying the mask effect to non-target face when a difference between a corresponding candidate facial feature vector and the target facial feature vector is greater than a threshold value.

8. A virtual makeup method implemented in a computing device, comprising:
   obtaining a video;
   obtaining a target facial image, wherein the target facial image comprises a target face to be edited;
   determining a target facial feature vector from the target facial image to be edited; and
   for each of a plurality of frames in the video, performing the steps of:
   identifying facial regions of individuals depicted in the video;
   generating candidate facial feature vectors for each of the identified facial regions;
   comparing each of the candidate facial feature vectors to the target facial feature vector; and
   replacing the target face with another face based on the comparison to generate an edited video, wherein the target face is replaced with another face when a difference between a corresponding candidate facial feature vector and the target facial feature vector is less than a threshold value.

9. A virtual makeup method implemented in a computing device, comprising:
obtaining a video;
obtaining a target facial image, wherein the target facial image comprises a target face to be edited;
determining a target facial feature vector from the target facial image to be edited; and
for each of a plurality of frames in the video, performing the steps of:
identifying facial regions of individuals depicted in the video;
generating candidate facial feature vectors for each of the identified facial regions;
comparing each of the candidate facial feature vectors to the target facial feature vector; and
replacing the target face with another face based on the comparison to generate an edited video, wherein faces other than the target face are replaced with another face when a difference between a corresponding candidate facial feature vector and the target facial feature vector is greater than a threshold value.

10. A system, comprising:
a memory storing instructions;
a processor coupled to the memory and configured by the instructions to at least:
obtain a video;
obtain a target facial image, wherein the target facial image comprises a target face to be edited;
determine a target facial feature vector from the target facial image to be edited; and
for each of a plurality of frames in the video, the processor is further configured to:
identify facial regions of individuals depicted in the video;
generate candidate facial feature vectors for each of the identified facial regions;
compare each of the candidate facial feature vectors to the target facial feature vector; and
apply a mask effect to facial regions of corresponding facial feature vectors based on the comparison to generate an edited video, wherein applying the mask effect to facial regions further comprises applying the mask effect to the target face when a difference between a corresponding candidate facial feature vector and the target facial feature vector is less than a threshold value.

11. The system of claim 10, wherein the mask effect comprises at least one of: a face-lift effect; an effect for blurring an entire facial region; or an effect for blurring target features in the facial region.

12. The system of claim 10, wherein the processor is further configured to generate, for each facial region displayed in the video, at least one graphical representation in a user interface, wherein a length of each graphical representation relative to a time axis corresponds to a time duration in which a corresponding facial region is displayed in the video, wherein a starting location of the graphical representation relative to the time axis corresponds to an instance in which the facial region begins to be displayed in the video for each graphical representation.

13. The system of claim 12, wherein each graphical representation comprises a bar shaped element.

14. The system of claim 10, wherein graphical representations corresponding to different facial regions identified during playback of the video are grouped together.

15. A non-transitory computer-readable storage medium storing instructions to be implemented by a computing device having a processor, wherein the instructions, when executed by the processor, cause the computing device to at least:
obtain a video;
obtain a target facial image, wherein the target facial image comprises a target face to be edited;
determine a target facial feature vector from the target facial image to be edited; and
for each of a plurality of frames in the video, the processor is further configured by the instructions to:
identify facial regions of individuals depicted in the video;
generate candidate facial feature vectors for each of the identified facial regions;
compare each of the candidate facial feature vectors to the target facial feature vector; and
apply a mask effect to facial regions of corresponding facial feature vectors based on the comparison to generate an edited video, wherein applying the mask effect to facial regions further comprises applying the mask effect to the target face when a difference between a corresponding candidate facial feature vector and the target facial feature vector is less than a threshold value.

16. The non-transitory computer-readable storage medium of claim 15, wherein the mask effect comprises at least one of: a face-lift effect; an effect for blurring an entire facial region; or an effect for blurring target features in the facial region.

17. The non-transitory computer-readable storage medium of claim 15, wherein the instructions, when executed by the processor, further cause the computing device to generate, for each facial region displayed in the video, at least one graphical representation in a user interface, wherein a length of each graphical representation relative to a time axis corresponds to a time duration in which a corresponding facial region is displayed in the video, wherein a starting location of the graphical representation relative to the time axis corresponds to an instance in which the facial region begins to be displayed in the video for each graphical representation.

18. The non-transitory computer-readable storage medium of claim 15, wherein graphical representations corresponding to different facial regions identified during playback of the video are grouped together.

19. A system, comprising:
a memory storing instructions;
a processor coupled to the memory and configured by the instructions to at least:
obtain a video;
obtain a target facial image, wherein the target facial image comprises a target face to be edited;
determine a target facial feature vector from the target facial image to be edited; and
for each of a plurality of frames in the video, the processor is further configured to:
identify facial regions of individuals depicted in the video;
generate candidate facial feature vectors for each of the identified facial regions;
compare each of the candidate facial feature vectors to the target facial feature vector; and apply a mask effect to facial regions of corresponding facial feature vectors based on the comparison to generate an edited video, wherein applying the mask effect to facial regions further comprises applying the mask effect to non-target face when a difference between a corresponding candidate facial feature vector and the target facial feature vector is greater than a threshold value.

20. A non-transitory computer-readable storage medium storing instructions to be implemented by a computing device having a processor, wherein the instructions, when executed by the processor, cause the computing device to at least:

obtain a video;

obtain a target facial image, wherein the target facial image comprises a target face to be edited;

determine a target facial feature vector from the target facial image to be edited; and for each of a plurality of frames in the video, the processor is further configured by the instructions to:

identify facial regions of individuals depicted in the video;

generate candidate facial feature vectors for each of the identified facial regions;

compare each of the candidate facial feature vectors to the target facial feature vector; and apply a mask effect to facial regions of corresponding facial feature vectors based on the comparison to generate an edited video, wherein applying the mask effect to facial regions further comprises applying the mask effect to non-target face when a difference between a corresponding candidate facial feature vector and the target facial feature vector is greater than a threshold value.

\* \* \* \* \*